United States Patent
Fukushima

(10) Patent No.: US 11,447,676 B2
(45) Date of Patent: *Sep. 20, 2022

(54) WORKING FLUID FOR HEAT CYCLE, COMPOSITION FOR HEAT CYCLE SYSTEM, AND HEAT CYCLE SYSTEM

(71) Applicant: AGC Inc., Tokyo (JP)

(72) Inventor: Masato Fukushima, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/544,027

(22) Filed: Dec. 7, 2021

(65) Prior Publication Data

US 2022/0089928 A1    Mar. 24, 2022

Related U.S. Application Data

(63) Continuation of application No. 17/202,426, filed on Mar. 16, 2021, which is a continuation of application No. 16/597,899, filed on Oct. 10, 2019, now Pat. No. 10,975,280, which is a continuation of application No. 15/789,486, filed on Oct. 20, 2017, now Pat. No. 10,472,551, which is a continuation of application No. 14/946,037, filed on Nov. 19, 2015, now Pat. No. 9,828,537, which is a continuation of application No. PCT/JP2014/068084, filed on Jul. 7, 2014.

(30) Foreign Application Priority Data

Jul. 12, 2013  (JP) ................................. 2013-146298
Jan. 31, 2014  (JP) ................................. 2014-017030

(51) Int. Cl.
  *C09K 5/04*  (2006.01)
  *F25B 1/00*  (2006.01)

(52) U.S. Cl.
  CPC ........ *C09K 5/045* (2013.01); *C09K 2205/126* (2013.01); *C09K 2205/22* (2013.01); *C09K 2205/40* (2013.01); *F25B 1/00* (2013.01); *F25B 2400/12* (2013.01)

(58) Field of Classification Search
  CPC ............... C09K 5/045; C09K 2205/40; C09K 2205/126; C09K 2205/22; C09K 5/04; F25B 2400/12; F25B 1/00
  USPC .......................... 252/67, 68, 69; 62/529, 467
  See application file for complete search history.

(56) References Cited

U.S. PATENT DOCUMENTS

| | | | |
|---|---|---|---|
| 9,493,694 B2 | 11/2016 | Kaneko et al. | |
| 9,624,413 B2 * | 4/2017 | Fukushima | F25B 13/00 |
| 9,828,537 B2 * | 11/2017 | Fukushima | C09K 5/045 |
| 9,957,430 B2 * | 5/2018 | Fukushima | F25B 1/00 |
| 9,976,067 B2 * | 5/2018 | Fukushima | C09K 5/045 |
| 10,072,194 B2 * | 9/2018 | Tasaka | C09K 5/045 |
| 10,131,827 B2 * | 11/2018 | Fukushima | C09K 5/044 |
| 10,351,746 B2 * | 7/2019 | Fukushima | C07C 21/18 |
| 10,358,591 B2 | 7/2019 | Fukushima | |
| 10,377,934 B2 * | 8/2019 | Fukushima | C09K 5/045 |
| 10,393,391 B2 * | 8/2019 | Maeyama | F24F 1/16 |
| 10,418,876 B2 | 9/2019 | Hayamizu et al. | |
| 10,472,551 B2 | 11/2019 | Fukushima | |
| 10,501,667 B2 * | 12/2019 | Fukushima | C10M 105/38 |
| 10,851,276 B2 * | 12/2020 | Fukushima | C10M 107/34 |
| 2010/0090156 A1 | 4/2010 | Nappa et al. | |
| 2012/0132848 A1* | 5/2012 | Sawada | C10M 171/008 252/68 |
| 2014/0070132 A1 | 3/2014 | Fukushima | |
| 2015/0337191 A1 | 11/2015 | Fukushima | |
| 2015/0376486 A1 | 12/2015 | Hashimoto et al. | |
| 2016/0075927 A1 | 3/2016 | Fukushima | |
| 2016/0333241 A1 | 11/2016 | Fukushima et al. | |
| 2016/0333242 A1 | 11/2016 | Fukushima et al. | |
| 2016/0333244 A1 | 11/2016 | Fukushima | |
| 2016/0333245 A1 | 11/2016 | Fujii et al. | |
| 2016/0340565 A1 | 11/2016 | Tasaka et al. | |
| 2016/0347982 A1 | 12/2016 | Fukushima et al. | |
| 2016/0355717 A1 | 12/2016 | Fukushima et al. | |
| 2016/0355719 A1 | 12/2016 | Fukushima et al. | |

(Continued)

FOREIGN PATENT DOCUMENTS

JP    2012505296 A    3/2012
WO   WO-2009101840 A1   8/2009

(Continued)

OTHER PUBLICATIONS

International Search Report dated Sep. 16, 2014 in PCT/JP2014/068084, filed Jul. 7, 2014.

(Continued)

*Primary Examiner* — Douglas J McGinty

(74) *Attorney, Agent, or Firm* — Element IP, PLC

(57) ABSTRACT

To provide a working fluid for heat cycle having a low global warming potential, which can replace R410A, a composition for a heat cycle system comprising it, and a heat cycle system employing the composition.

A working fluid for heat cycle, which comprises trifluoroethylene and 2,3,3,3-tetrafluoropropene, wherein the total proportion of trifluoroethylene and 2,3,3,3-tetrafluoropropene based on the entire amount of the working fluid is from 70 to 100 mass %, and the proportion of trifluoroethylene based on the total amount of trifluoroethylene and 2,3,3,3-tetrafluoropropene is from 35 to 95 mass %, a composition for a heat cycle system comprising the working fluid for heat cycle, and a heat cycle system employing the composition.

17 Claims, 4 Drawing Sheets

(56) References Cited

U.S. PATENT DOCUMENTS

| | | |
|---|---|---|
| 2016/0369145 A1 | 12/2016 | Fukushima et al. |
| 2017/0016660 A1 | 1/2017 | Nishiyama et al. |
| 2017/0328586 A1 | 11/2017 | Maeyama |
| 2017/0335159 A1 | 11/2017 | Fukushima et al. |
| 2018/0299175 A1 | 10/2018 | Hayamizu et al. |

FOREIGN PATENT DOCUMENTS

| | | |
|---|---|---|
| WO | WO-2009101872 A1 | 8/2009 |
| WO | WO-2009101873 A1 | 8/2009 |
| WO | WO-2011118732 A1 | 9/2011 |
| WO | WO-2011118733 A1 | 9/2011 |
| WO | WO-2012157764 A1 | 11/2012 |

OTHER PUBLICATIONS

CAS reg. No. 359-11-5, Nov. 16, 1984 (Year: 1984).
CAS reg. No. 754-12-1, Nov. 16, 1984 (Year: 1984).

\* cited by examiner

WORKING FLUID FOR HEAT CYCLE, COMPOSITION FOR HEAT CYCLE SYSTEM, AND HEAT CYCLE SYSTEM

CROSS-REFERENCE TO RELATED APPLICATIONS

This application is a continuation of U.S. patent application Ser. No. 17/202,426, filed Mar. 16, 2021, which is a continuation of U.S. patent application Ser. No. 16/597,899, filed Oct. 10, 2019, which is a continuation of U.S. patent application Ser. No. 15/789,486, filed Oct. 20, 2017, which is a continuation of U.S. patent application Ser. No. 14/946,037, filed Nov. 19, 2015, which is a continuation of International Application No. PCT/JP2014/068084, filed Jul. 7, 2014, the disclosures of which are incorporated herein by reference in their entireties. This application claims priority to Japanese Patent Application No. 2014-017030, filed Jan. 31, 2014, and Japanese Patent Application No. 2013-146298, filed Jul. 12, 2013, the disclosures of which are incorporated herein by reference in their entireties.

TECHNICAL FIELD

The present invention relates to a working fluid for heat cycle, a composition for a heat cycle system comprising the working fluid, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for heat cycle such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC), such as chlorotrifluoromethane or dichlorodifluoromethane or a hydrochlorofluorocarbon (HCFC) such as chlorodifluoromethane has been used.

However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

Accordingly, in recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

2,3,3,3-Tetrafluoropropene (HFO-1234yf) is known as a working fluid having a low global warming potential (GWP). However, although HFO-1234yf has a high coefficient of performance, its refrigerating capacity is low as compared with R410A, and it cannot be used for conventional air-conditioning apparatus, etc., for which R410A has been used, such as a so-called package air-conditioner and room air-conditioner.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

It has been know that HFO-1134yf is useful as a HFO to be used for a working fluid for heat cycle, and a technique relating to HFO-1234yf has been developed. For example, Patent Document 2 discloses compositions containing HFO-1234yf obtainable in production of HFO-1234yf by a specific process. The compositions disclosed in Patent Document 2 contain many compounds, and compositions containing HFO-1234yf and HFO-1123 are included. However, HFO-1123 is disclosed only as a by-product of HFO-1234yf together with many other compounds, and Patent Document 2 failed to disclose use of a composition containing the two in a specific proportion as a working fluid and that the composition has excellent coefficient of performance and refrigerating capacity.

Heretofore, a combination of HFO-1234yf and HFO-1123 has not been found or indicated in any documents yet, with a view to obtaining a working fluid which is practically useful comprehensively considering the balance of the capacity, the efficiency and the temperature gradient as an alternative to R410A.

PRIOR ART DOCUMENTS

Patent Documents

Patent Document 1: WO2012/157764
Patent Document 2: JP-A-2012-505296

DISCLOSURE OF INVENTION

Technical Problem

The present inventor has confirmed that the critical temperature of HFO-1123 is 59.2° C. Thus, it was found that as an alternative to conventionally used R410A, HFO-1123 has a low critical temperature and it can substitute working fluids only in a limited range. Further, even when various HFCs disclosed in Patent Document 1 are combined, sufficient coefficient of performance and refrigerating capacity cannot necessarily be achieved. The object of the present invention is to provide a working fluid for heat cycle which achieves not only the critical temperature but also sufficient cycle performance as an alternative to R410A simultaneously, a composition for a heat cycle system comprising the working fluid, and a heat cycle system employing the composition.

Further, the object of the present invention is to provide a working fluid for heat cycle with which practically sufficient cycle performance will be obtained while suppressing the influence over global warming, a composition for a heat cycle system comprising the working fluid, and a heat cycle system employing the composition.

Solution to Problem

Under these circumstances, the present inventor has accomplished the present invention by intentionally using HFO-1234yf having a low refrigerating capacity in combination with HFO-1123 in a specific proportion.

That is, the present invention provides a working fluid for heat cycle, a composition for a heat cycle system and a heat cycle system of the following [1] to [15].

[1] A working fluid for heat cycle, which contains trifluoroethylene and 2,3,3,3-tetrafluoropropene, wherein the total proportion of trifluoroethylene and 2,3,3,3-tetrafluoropropene based on the entire amount of the working fluid is from 70 to 100 mass %, and the proportion of trifluoroethylene based on the total amount of trifluoroethylene and 2,3,3,3-tetrafluoropropene is from 35 to 95 mass %.

[2] The working fluid for heat cycle according to [1], wherein the total proportion of trifluoroethylene and 2,3,3,3-tetrafluoropropene based on the entire amount of the working fluid is from 80 to 100 mass %.

[3] The working fluid for heat cycle according to [1] or [2], wherein the proportion of trifluoroethylene based on the total amount of trifluoroethylene and 2,3,3,3-tetrafluoropropene is from 40 to 95 mass %.

[4] The working fluid for heat cycle according to any one of [1] to [3], wherein the proportion of trifluoroethylene based on the entire amount of the working fluid is at most 70 mol %.

[5] The working fluid for heat cycle according to any one of [1] to [4], which further contains a saturated hydrofluorocarbon.

[6] The working fluid for heat cycle according to any one of [1] to [5], which further contains a hydrofluorocarbon having a carbon-carbon double bond other than trifluoroethylene and 2,3,3,3-tetrafluoropropene.

[7] The working fluid for heat cycle according to [6], wherein the hydrofluorocarbon having a carbon-carbon double bond is at least one member selected from the group consisting of 1,2-difluoroethylene, 2-fluoropropene, 1,1,2-trifluoropropene, trans-1,2,3,3,3-pentafluoropropene, cis-1,2,3,3,3-pentafluoropropene, trans-1,3,3,3-tetrafluoropropene, cis-1,3,3,3-tetrafluoropropene and 3,3,3-trifluoropropene.

[8] The working fluid for heat cycle according to [6] or [7], wherein the hydrofluorocarbon having a carbon-carbon double bond is trans-1,3,3,3-tetrafluoropropene.

[9] The working fluid for heat cycle according to [5], wherein the saturated hydrofluorocarbon is at least one member selected from the group consisting of difluoromethane, 1,1-difluoroethane, 1,1,1-trifluoroethane, 1,1,2,2-tetrafluoroethane, 1,1,1,2-tetrafluoroethane and pentafluoroethane.

[10] The working fluid for heat cycle according to [5] or [9], wherein the saturated hydrofluorocarbon is at least one member selected from the group consisting of difluoromethane, 1,1,1,2-tetrafluoroethane and pentafluoroethane.

[11] The working fluid for heat cycle according to [10], wherein the saturated hydrofluorocarbon is difluoromethane, and based on the total amount of trifluoroethylene, 2,3,3,3-tetrafluoropropene and difluoromethane, the proportion of trifluoroethylene is from 30 to 70 mass %, the proportion of 2,3,3,3-tetrafluoropropene is at most 40 mass %, and the proportion of difluoromethane is at most 30 mass %, and the proportion of trifluoroethylene based on the entire amount of the working fluid is at most 70 mol %.

[12] A composition for a heat cycle system, which comprises the working fluid for heat cycle as defined in any one of [1] to [11] and a lubricating oil.

[13] A heat cycle system, which employs the composition for a heat cycle system as defined in [12].

[14] The heat cycle system according to [13], which is a refrigerating apparatus, an air-conditioning apparatus, a power generation system, a heat transport apparatus or a secondary cooling machine.

[15] The heat cycle system according to [13], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

The working fluid for heat cycle and the composition for a heat cycle system containing the working fluid of the present invention have less influence over global warming and have practically sufficient heat cycle performance.

The heat cycle system of the present invention, which employs the composition for a heat cycle system of the present invention, has less influence over global warming and has practically sufficient heat cycle performance.

Further, the working fluid for heat cycle of the present invention satisfies the above conditions and can replace conventionally used R410A.

DESCRIPTION OF EMBODIMENTS

Now, the present invention will be described in detail.
<Working Fluid>

The working fluid of the present invention is a working fluid for heat cycle, which contains HFO-1123 and HFO-1234yf, wherein the total proportion of HFO-1123 and HFO-1234yf based on the entire amount of the working fluid is from 70 to 100 mass %, and the proportion of HFO-1123 based on the total amount of HFO-1123 and HFO-1234yf is from 35 to 95 mass %.

As heat cycle, heat cycle by a heat exchanger such as a condenser or an evaporator may be used without any particular restriction.

The composition range of the present invention will be described below as the composition range (S).

Figure 1:
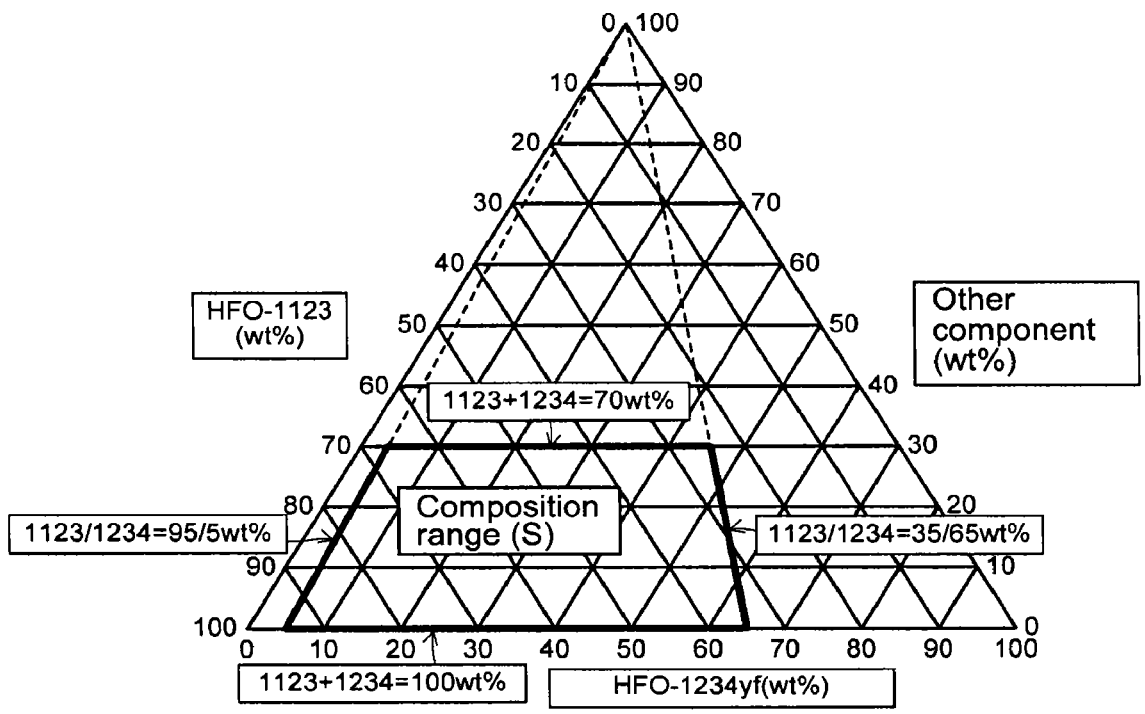
FIG. 1 is a diagram illustrating a composition range of a working fluid for heat cycle of the present invention in triangular coordinates of a composition (mass %) of a mixture of HFO-1123, HFO-1234yf and other component.

The composition range (S) of the working fluid for heat cycle of the present invention is shown in triangular coordinates in FIG. 1. The working fluid for heat cycle of the present invention is a mixed fluid containing HFO-1123 and HFO-1234yf and as the case requires, other component. FIG. 1 illustrates triangular coordinates indicating the composition (mass %) of HFO-1123, HFO-1234yf and other component by the respective three sides, and a trapezoidal region surrounded by a heavy solid line including part of the base of the triangle corresponds to the composition range (S) of the working fluid of the present invention. In FIG. 1, "1123/1234" means the mass ratio of HFO-1123 to HFO-1234yf, and "1123+1234" means the total mass % of HFO-1123 and HFO-1234yf based on the entire amount of the working fluid. Now, the composition of the working fluid of the present invention will be described with reference to FIG. 1 as needed.

Here, the global warming potential (100 years) of HFO-1234yf is 4 by a value in Intergovernmental Panel on Climate Change (IPCC), Fourth assessment report (2007), and the global warming potential (100 years) of HFO-1123 is 0.3 as a value measured in accordance with IPCC Fourth assessment report. GWP in this specification is a value (100 years) in IPCC Fourth assessment report unless otherwise specified. Further, GWP of a mixture is represented by a weighted average by the composition mass. For example, GWP of a mixture of HFO-1123 and HFO-1234yf in a mass ratio of 1:1 is calculated as $(0.3+4)/2=2.15$.

The working fluid of the present invention has a low GWP since it contains HFO-1123 with a very low GWP and HFO-1234yf in a total content of at least 70 mass %. In the triangular coordinates in FIG. 1, in a case where GWP of other component is higher than those of HFO-1123 and HFO-1234yf, as in the case of the after-mentioned saturated HFC for example, the closer to the base, the lower the GWP. Further, in such a case, a composition with the minimum GWP of the working fluid of the present invention is a composition indicated by the lower left angle in the trapezoid (composition range (S)) in FIG. 1, that is, such a composition that the working fluid consists solely of HFO-1123 and HFO-1234yf in a proportion of HFO-1234yf of 5 mass % based on 95 mass % of HFO-1123.

The proportion of HFO-1123 based on the total amount of HFO-1123 and HFO-1234yf in the working fluid is from 35 to 95 mass %, preferably from 40 to 95 mass %, more preferably from 50 to 90 mass %, further preferably from 50 to 85 mass %, most preferably from 60 to 85 mass %. In the triangular coordinates in FIG. 1, the left side in the trapezoid indicating the composition range (S) indicates a boundary of 1123/1234=95/5 mass %. The right side indicates a boundary of 1123/1234=35/65 mass %. The upper side indicates a line of 1123+1234=70 mass %, and the lower side (base) indicates a line of 1123+1234=100 mass %.

Within a range of the proportion of HFO-1123 based on the total amount of HFO-1123 and HFO-1234yf in the working fluid of at least 35 mass %, the temperature gradient is small, such being favorable. Within a range of at least 40 mass %, the temperature gradient is smaller, and such is practically more favorable as an alternative to R410A. Further, within a range of the proportion of HFO-1123 based on the total amount of HFO-1123 and HFO-1234yf in the working fluid of from 35 to 95 mass %, refrigerating cycle performance sufficient as an alternative to conventional R410A will be achieved also in view of the coefficient of performance, the refrigerating capacity and the critical temperature in addition to the temperature gradient. By using such a working fluid of the present invention for heat cycle, practically sufficient refrigerating capacity and coefficient of performance will be obtained.

The total content of HFO-1123 and HFO-1234yf based on 100 mass % of the working fluid of the present invention is from 70 to 100 mass %. When the total content of HFO-1123 and HFO-1234yf is within the above range, the efficiency will be further increased while maintaining certain capacity when such a working fluid is used for heat cycle, and favorable cycle performance will be obtained. The total content of HFO-1123 and HFO-1234yf based on 100 mass % of the working fluid is preferably from 80 to 100 mass %, more preferably from 90 to 100 mass %, further preferably from 95 to 100 mass %.

As mentioned above, HFO-1123 and HFO-1234yf in the working fluid of the present invention are both HFOs and are compounds which have less influence over global warming. Further, although HFO-1123 has excellent capacity as a working fluid, but may not be sufficient in view of the coefficient of performance as compared with other HFOs. Further, when HFO-1123 is used alone, from the viewpoint of the critical temperature, sufficient refrigerating cycle performance may not be expected in some cases for an application in which R410A has been used.

Further, HFO-1123 is known to undergo self-decomposition when used alone at high temperature or with an ignition source under high pressure. Therefore, an attempt to suppress self-decomposition reaction by mixing HFO-1123 with another component such as vinylidene fluoride to form a mixture having a lowered content of HFO-1123 has been reported (Combustion, Explosion, and Shock Waves, Vol. 42, No 2, pp. 140-143, 2006).

However, under the temperature and pressure conditions under which HFO-1123 is used as a working fluid, a composition with which the working fluid can be safely used while maintaining refrigerating cycle performance of HFO-1123 has not been known. Accordingly, the present inventor has confirmed that self-decomposition can be suppressed under the temperature and pressure conditions under which a composition containing HFO-1123 is used as a working fluid, when the content of HFO-1123 based on the entire amount of the composition is at most 70 mol %.

<Evaluation of Self-Decomposition Property of HFO-1123>

The self-decomposition property was evaluated in equipment in accordance with method A recommended as equipment for measurement of the combustion range of a gas mixture containing halogen, by individual notifications in High Pressure Gas Safety Act.

Specifically, a mixed fluid of HFO-1123 and HFO-1234yf, HFO-1123 and HFC-32 or HFO-1123, HFO-1234yf and HFC-32 in various proportions, is enclosed in a spherical pressure resistant reactor having an internal capacity of 650 cm$^3$ and having a predetermined temperature controlled from the outside to a predetermined pressure, and then a platinum wire disposed in the interior was fused to apply an energy of about 30 J. Whether the self-decomposition reaction occurred or not was confirmed by measuring the temperature and pressure changes in the pressure resistant reactor after the application. A case where a pressure increase and a temperature increase were confirmed was evaluated as self-decomposition reaction occurred. The results are shown in Table 1 with respect to mixed fluids of HFO-1123 and HFO-1234yf, in Table 2 with respect to mixed fluids of HFO-1123 and HFC-32, and in Table 3 with respect to mixed fluids of HFO-1123, HFO-1234yf and HFC-32. The pressure in Tables 1, 2 and 3 is the gage pressure.

TABLE 1

| HFO-1123/ HFO-1234yf | | Pressure [MPaG] | | Temperature [° C.] | | Self-decomposition reaction |
|---|---|---|---|---|---|---|
| [mass %/ mass %] | [mol %/ mol %] | Before ignition | After ignition | Before ignition | After ignition | |
| 52/48 | 60/40 | 0.98 | 0.98 | 250 | 250.2 | Nil |
| 63/37 | 70/30 | 0.98 | 0.98 | 250 | 250.2 | Nil |
| 74/26 | 80/20 | 0.98 | 4.00 | 250 | 291.6 | Occurred |
| 87/13 | 90/10 | 0.98 | 4.80 | 250 | 291.1 | Occurred |

TABLE 2

| HFO-1123/ HFC-32 | | Pressure [MPaG] | | Temperature [° C.] | | Self-decomposition reaction |
|---|---|---|---|---|---|---|
| [mass %/ mass %] | [mol %/ mol %] | Before ignition | After ignition | Before ignition | After ignition | |
| 70/30 | 60/40 | 0.98 | 0.98 | 250 | 250.5 | Nil |
| 80/20 | 72/28 | 0.98 | 0.98 | 250 | 250.4 | Nil |
| 85/15 | 78/22 | 0.98 | 4.60 | 250 | 290.0 | Occurred |

TABLE 3

| HFO-1123/HFO-1234yf/HFC-32 | | Pressure [MPaG] | | Temperature [° C.] | | Self-decomposition reaction |
|---|---|---|---|---|---|---|
| [mass %/mass %/ mass %] | [mol %/mol %/ mol %] | Before ignition | After ignition | Before ignition | After ignition | |
| 70/10/20 | 64/7/29 | 0.98 | 0.98 | 250 | 250.5 | Nil |
| 70/20/10 | 70/14/16 | 0.98 | 0.98 | 250 | 250.5 | Nil |
| 80/10/10 | 78/7/15 | 0.98 | 4.00 | 250 | 289.5 | Occurred |

The working fluid of the present invention may be used for a heat cycle system even though it is a self-decomposable composition, by sufficiently careful handling depending upon the use conditions. However, a composition range of the working fluid with high safety and with high refrigerating cycle performance as well, can be achieved by selecting a composition range excluding the composition range with self-decomposition property thus confirmed from the composition range (S) of the working fluid of the present invention, that is, by selecting a composition range in which the composition range (S) of the working fluid of the present invention and a region with a content of HFO-1123 based on the entire amount of the working fluid of at most 70 mol % overlap.

HFO-1234yf is a HFO having the refrigerating capacity and the coefficient of performance as a working fluid in a balanced manner. Although the critical temperature (94.7° C.) of HFO-1234yf is high as compared with HFO-1123, its capacity when used alone is insufficient as compared with R410A.

HFO-1123 and HFO-1234yf in the working fluid of the present invention are not in an azeotropic state. In general, a non-azeotropic mixture fluid as a working fluid has such properties that the initiation temperature and the completion temperature of evaporation in an evaporator or of condensation in a condenser, for example, as a heat exchanger, differ from each other, that is, it has a temperature gradient. Accordingly, since the working fluid of the present invention mainly contains HFO-1123 and HFO-1234yf, that is, it contains HFO-1123 and HFO-1234yf in a total content of at least 70 mass % based on the entire amount of the working fluid, it has a temperature gradient.

Figure 2:
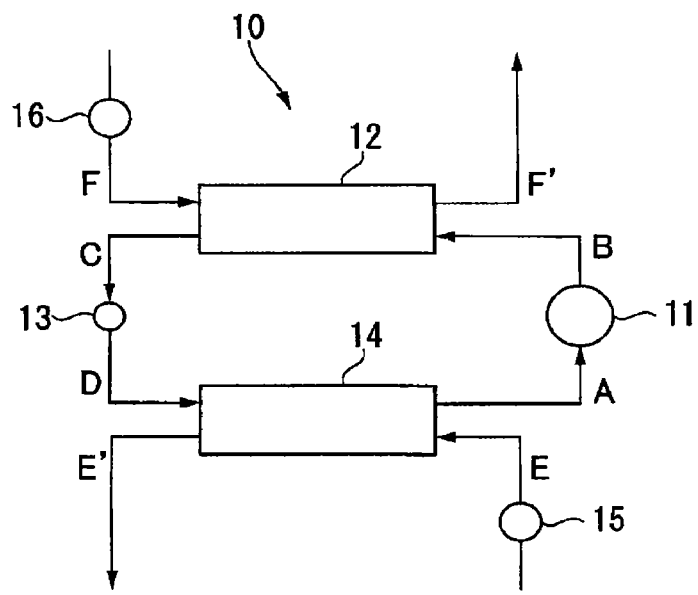
FIG. 2 is a schematic construction view illustrating a refrigerating cycle system as an example of a heat cycle system of the present invention.

The influence in a heat cycle system when the working fluid of the present invention has a temperature gradient will be described with reference to a case where the working fluid is used for a heat cycle system shown in FIG. 2. FIG. 2 is a schematic construction view illustrating a refrigerating cycle system as an example of a heat cycle system of the present invention.

A refrigerating cycle system 10 comprises a compressor 11 to compress a working fluid (vapor), a condenser 12 to cool and liquefy the working fluid vapor discharged from the compressor 11, an expansion valve 13 to let the working fluid (liquid) discharged from the condenser 12 expand, and an evaporator 14 to heat and vaporize the working fluid in a liquid state discharged from the expansion valve 13.

In the refrigerating cycle system 10, the temperature of the working fluid increases from an inlet toward an outlet of the evaporator 14 at the time of evaporation, and on the contrary, the temperature decreases from an inlet toward an outlet of the condenser 12 at the time of condensation. In the refrigerating cycle system 10, such is achieved by heat exchange between the working fluid and a heat source fluid such as water or the air flowing to face the working fluid in the evaporator 14 or the condenser 12. The heat source fluid is represented by "E→E" in the evaporator 14 and by "F→F" in the condenser 12 in the refrigerating cycle system 10.

Here, when a single refrigerant is used, since there is no temperature gradient, the temperature difference between the outlet temperature and the inlet temperature of the evaporator 14 is substantially constant, however, when a non-azeotropic mixture fluid is used, the temperature difference will not be constant. For example, in a case where the working fluid is to be evaporated at 0° C. in the evaporator 14, the inlet temperature is lower than 0° C., and frosting may occur in the evaporator 14. Particularly, the larger the temperature gradient, the lower the inlet temperature and the more frosting is likely to occur.

Further, in a case where a non-azeotropic mixture fluid with a large temperature gradient is used for the refrigerating cycle system 10, since the compositions of the gaseous phase and the liquid phase are significantly different from each other, if the non-azeotropic mixture fluid circulating in the system 10 leaks out, the composition of the non-azeotropic mixture fluid circulating in the system 10 may significantly change as between before and after the leakage.

Further, for example, as shown in the refrigerating cycle system 10, usually in the heat cycle system, the heat exchange efficiency is to be improved by making the working fluid and the heat source fluid such as water or the air flowing in heat exchangers such as the evaporator 14 and the condenser 12 flow in counter-current flow. Here, since the temperature difference of the heat source fluid is small usually in a long-term stable operation state except for at the time of start-up, it is difficult to obtain a heat cycle system with a good energy efficiency with a non-azeotropic mixture fluid with a large temperature gradient. Accordingly, a non-azeotropic mixture fluid with an appropriate temperature gradient is desired.

The composition range and the content range of the combination of HFO-1123 and HFO-1234yf in the working fluid of the present invention are ranges within which the working fluid has a practical temperature gradient.

The temperature gradient of the working fluid is preferably at most 9.5° C., more preferably at most 9° C., further preferably at most 8.4° C., most preferably at most 7.2° C.

[Optional Component]

The working fluid of the present invention may optionally contain a compound commonly used for a working fluid, in addition to HFO-1123 and HFO-1234yf, within a range not to impair effects of the present invention. Even when the working fluid of the present invention contains an optional compound (which will be referred to as an optional component), the temperature gradient of the working fluid will not be 0 and the working fluid has a considerable temperature gradient. The temperature gradient of the working fluid of the present invention varies depending upon the mixture ratio of HFO-1123 and HFO-1234yf and the optional component contained as the case requires.

The optional component is preferably a HFC or a HFO (a HFC having a carbon-carbon double bond) other than HFO-1123 and HFO-1234yf.

(HFC)

As the HFC as the optional component, a HFC having an effect to decrease the temperature gradient, to improve the capacity or to further increase the efficiency, when used in combination with HFO-1123 and HFO-1234yf for heat cycle, is used. When the working fluid of the present invention contains such a HFC, more favorable cycle performance will be obtained.

A HFC is known to have a high GWP as compared with HFO-1123 and HFO-1234yf. Accordingly, a HFC to be used as the optional component is selected with a view to adjusting the GWP within an acceptable range, in addition to improving cycle performance as the working fluid.

As a HFC which has less influence over the ozone layer and which has less influence over global warming, specifically preferred is a $C_{1-5}$ HFC. The HFC may be linear, branched or cyclic.

The HFC may, for example, be difluoromethane (HFC-32), difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent refrigerating cycle performance, the HFC is preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-134a or HFC-125.

The HFC may be used alone or in combination of two or more.

With respect to GWP of the above preferred HFC, GWP of HFC-32 is 675, GWP of HFC-134a is 1,430, and GWP of HFC-125 is 3,500. With a view to suppressing the GWP of the obtainable working fluid to be low, the HFC as the optional component is most preferably HFC-32.

In a case where HFO-1123, HFO-1234yf and HFC-32 are combined for the working fluid of the present invention, it is preferred that the composition range (S) of the working fluid of the present invention is satisfied and that based on the total amount of HFO-1123, HFO-1234yf and HFC-32, the proportion of HFO-1123 is from 30 to 80 mass %, the proportion of HFO-1234yf is at most 40 mass %, and the proportion of HFC-32 is at most 30 mass %. This composition range will be described below as the composition range (P).

Figure 3:
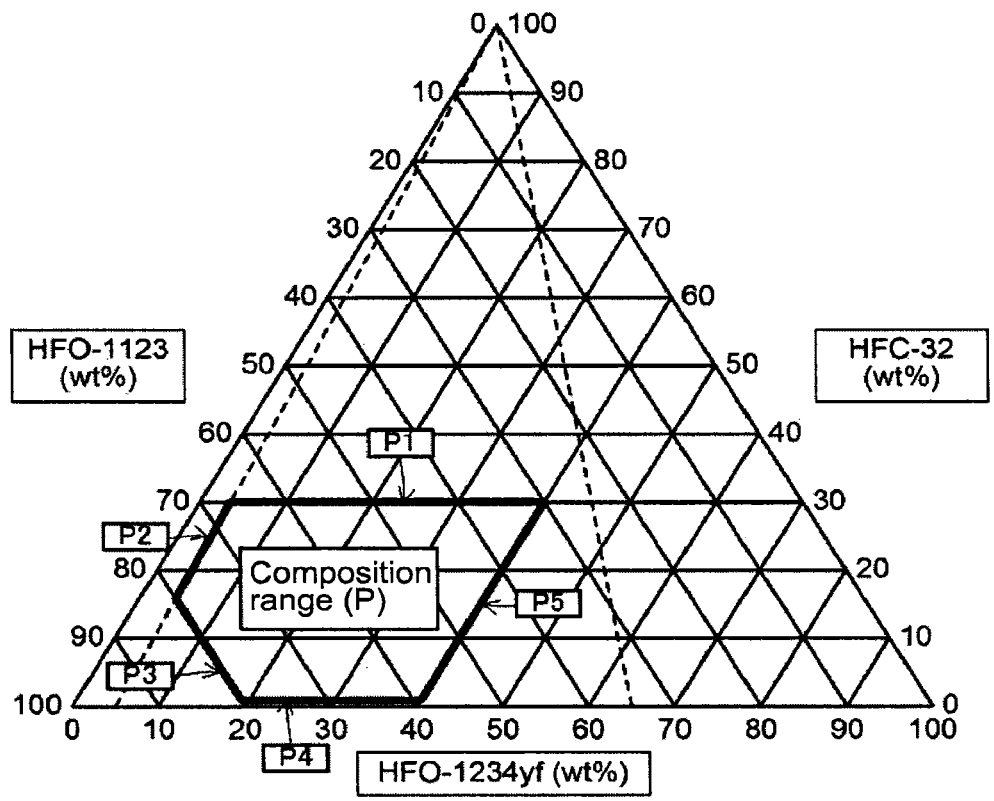
FIG. 3 is a diagram illustrating a composition range of one embodiment of a working fluid for heat cycle of the present invention in triangular coordinates of a composition (mass %) of a mixture of HFO-1123, HFO-1234yf and HFC-32.

The composition range (P) in a case where the working fluid for heat cycle of the present invention comprises HFO-1123, HFO-1234yf and HFC-32 is shown in triangular coordinates in FIG. 3. That is, FIG. 3 illustrates triangular coordinates indicating the composition (mass %) of HFO-1123, HFO-1234yf and HFC-32 by the respective three sides, and a pentangular region surrounded by a heavy solid line, one side of which is slightly on the inner side of the base of the triangular, corresponds to the composition range (P) of the preferred working fluid of the present invention.

The sides (P1) to (P5) of the pentagon indicating the composition range (P) in FIG. 3 respectively indicate boundaries of the following ranges. In the following formulae, abbreviated names of the respective compounds indicate the proportions (mass %) of the respective compounds based on the entire amount of the working fluid, that is, the total amount of HFO-1123, HFO-1234yf and HFC-32.

(P1) 70 mass %≤HFO-1123+HFO-1234yf, and HFC-32≤30 mass %

(P2) HFO-1123/HFO-1234yf≤95/5 mass %

(P3) HFO-1123≤80 mass %

(P4) 0 mass %<HFC-32

(P5) HFO-1234yf≤40 mass %

As described above, GWPs of HFO-1123, HFO-1234yf and HFC-32 are respectively 0.3, 4 and 675. The composition with which GWP is highest in the composition range (P) is the composition at the upper right angle of the pentagon, that is, the composition comprising HFO-1123:HFO-1234yf:HFC-32 of 30 mass %:40 mass %:30 mass %, and GWP with the composition is calculated as (0.3×30+4×40+675×30)/100=204.19. The working fluid in such a composition range (P) is a working fluid having respective characteristics of HFO-1123, HFO-1234yf and HFC-32 in a balanced manner, and having defects of the respective components suppressed. That is, the working fluid in the composition range (P) is a working fluid which has a low GWP, has a small temperature gradient and has a certain performance and efficiency when used for heat cycle, and thus with such a working fluid, favorable cycle performance will be obtained.

Further, in the same manner as above, by selecting a composition range excluding the composition range with self-decomposition property as confirmed above from such a composition range (P), that is, by selecting a composition range in which the composition range (P) and a region with a content of HFO-1123 based on the entire amount of the working fluid of less than 70 mol % overlap, a composition range of the working fluid with high safety and with high refrigerating cycle performance as well, can be achieved.

In a case where the working fluid of the present invention comprises three compounds of HFO-1123, HFO-1234yf and HFC-32, a more preferred composition may be a composition containing HFO-1123 in a proportion of from 30 to 70 mass %, HFO-1234yf in a proportion of from 4 to 40 mass %, and HFC-32 in a proportion of higher than 0 to 30 mass %, based on the total amount of HFO-1123, HFO-1234yf and HFC-32 and having a content of HFO-1123 based on the entire amount of the working fluid of at most 70 mol %, within a range of the composition range (P). From the viewpoint of the relative coefficient of performance, the content of HFC-32 is preferably at least 5 mass %, more preferably at least 8 mass %.

(HFO Other than HFO-1123 and HFO-1234yf)

The HFO as the optional component may, for example, be 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO as the optional component is, in view of a high critical temperature and excellent safety and coefficient of performance, preferably HFO-1234ze(E) or HFO-1234ze(Z), more preferably HFO-1234ze(E).

The HFO other than HFO-1123 and HFO-1234yf may be used alone or in combination of two or more.

In a case where the working fluid of the present invention contains the HFC and/or the HFO other than HFO-1123 and HFO-1234yf as the optional component, the total content of the HFC and the HFO other than HFO-1123 and HFO-1234yf per 100 mass % of the working fluid is at most 30 mass %, preferably from 1 to 20 mass %, more preferably from 1 to 10 mass %, further preferably from 2 to 8 mass %. The total content of the HFC and the HFO other than HFO-1123 and HFO-1234yf in the working fluid is properly adjusted within the above range depending upon the type of the HFC and the HFO other than HFO-1123 and HFO-1234yf to be used, with a view to decreasing the temperature gradient, improving the capacity or further increasing the efficiency when used for heat cycle in combination with HFO-1123 and HFO-1234yf, and further considering the global warming potential.

(Other Optional Component)

The working fluid of the present invention may contain, other than the above optional component, another optional component such as carbon dioxide, a hydrocarbon, a chlorofluoroolefin (CFO) or a hydrochlorofluoroolefin (HCFO). Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid of the present invention contains a hydrocarbon, its content is at most 30 mass %, preferably from 1 to 20 mass %, more preferably from 1 to 10 mass %, further preferably from 3 to 8 mass % per 100 mass % of the working fluid. When the content of the hydrocarbon is at least the lower limit, the solubility of a mineral lubricating oil in the working fluid will be favorable.

The CFO may, for example, be chlorofluoropropene or chlorofluoroethylene. With a view to suppressing flammability of the working fluid without significantly decreasing the cycle performance of the working fluid of the present invention, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

When the working fluid of the present invention contains the CFO, its content is at most 30 mass %, preferably from 1 to 20 mass %, more preferably from 1 to 10 mass %, further preferably from 2 to 8 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid of the present invention, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid of the present invention contains the HCFO, the content of the HCFO per 100 mass % of the working fluid of the present invention is at most 30 mass %, preferably from 1 to 20 mass %, more preferably from 1 to 10 mass %, further preferably from 2 to 8 mass %. When the content of the HCFO is at least the lower limit, the flammability of the working fluid tends to be suppressed. When the content of the HCFO is at most the upper limit, favorable cycle performance is likely to be obtained.

When the working fluid of the present invention contains the above optional component and another optional component, their total content is at most 30 mass % per 100 mass % of the working fluid.

The above-described working fluid of the present invention is a working fluid obtained by mixing HFO-1123 which is excellent in the performance as the working fluid and HFO-1234yf which has the capacity and the efficiency as the working fluid in a balanced manner, which are both HFOs having less influence over global warming, in combination in such a proportion as to improve the cycle performance as compared with a case where they are respectively used alone, considering the temperature gradient in a mixed fluid of them, and has practically sufficient cycle performance while suppressing the influence over global warming.

[Application to Heat Cycle System]

(Composition for Heat Cycle System)

The working fluid of the present invention may be used, in application to a heat cycle system, as the composition for a heat cycle system of the present invention usually as mixed with a lubricating oil. The composition for a heat cycle system of the present invention comprising the working fluid of the present invention and a lubricating oil may further contain known additives such as a stabilizer and a leak detecting substance.

(Lubricating Oil)

As a lubricating oil, a known lubricating oil which has been used for the composition for a heat cycle system together with a working fluid comprising a halogenated hydrocarbon may be used without any particular restrictions. The lubricating oil may, for example, be specifically an oxygen-containing synthetic oil (such as an ester lubricating oil or an ether lubricating oil), a fluorinated lubricating oil, a mineral lubricating oil or a hydrocarbon synthetic oil.

The ester lubricating oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Specifically, ditridecyl glutarate, di(2-ethylhexyl) adipate, diisodecyl adipate, ditridecyl adipate or di(3-ethylhexyl) sebacate may, for example, be mentioned.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether lubricating oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or an ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated lubricating oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral lubricating oil may, for example, be a naphthene mineral oil or a paraffin mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The lubricating oil may be used alone or in combination of two or more.

The lubricating oil is preferably at least one member selected from a polyol ester oil, a polyvinyl ether oil and a polyglycol oil.

The amount of the lubricating oil is not limited within a range not to remarkably decrease the effects of the present invention, and is preferably from 10 to 100 parts by mass, more preferably from 20 to 50 parts by mass, per 100 parts by mass of the working fluid.

(Stabilizer)

The stabilizer is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is not limited within a range not to remarkably decrease the effects of the present invention, and is preferably at most 5 parts by mass, more preferably at most 1 part by mass per 100 parts by mass of the working fluid.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used.

The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 parts by mass, more preferably at most 0.5 part by mass per 100 parts by mass of the working fluid.

<Heat Cycle System>

The heat cycle system of the present invention is a system employing the working fluid of the present invention. When the working fluid of the present invention is applied to a heat cycle system, usually the working fluid is applied as contained in the composition for a heat cycle system. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine. Among them, the heat cycle system of the present invention, which stably exhibits heat cycle performance in a working environment at higher temperature, is preferably employed as an air-conditioning apparatus to be disposed outdoors in many cases.

Further, the heat cycle system of the present invention is preferably employed also for a refrigerating system.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Now, as an example of the heat cycle system according the embodiment of the present invention, a refrigerating cycle system will be described with reference to a refrigerating cycle system 10 which has been roughly described above, of which the schematic construction view is shown in FIG. 2, as an example. A refrigerating cycle system is a system utilizing coldness obtained by an evaporator.

A refrigerating cycle system 10 shown in FIG. 2 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in an evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure enthalpy chart (curve) as shown in FIG. 4, may be represented as a trapezoid having points A, B, C and D as vertexes.

Figure 4:
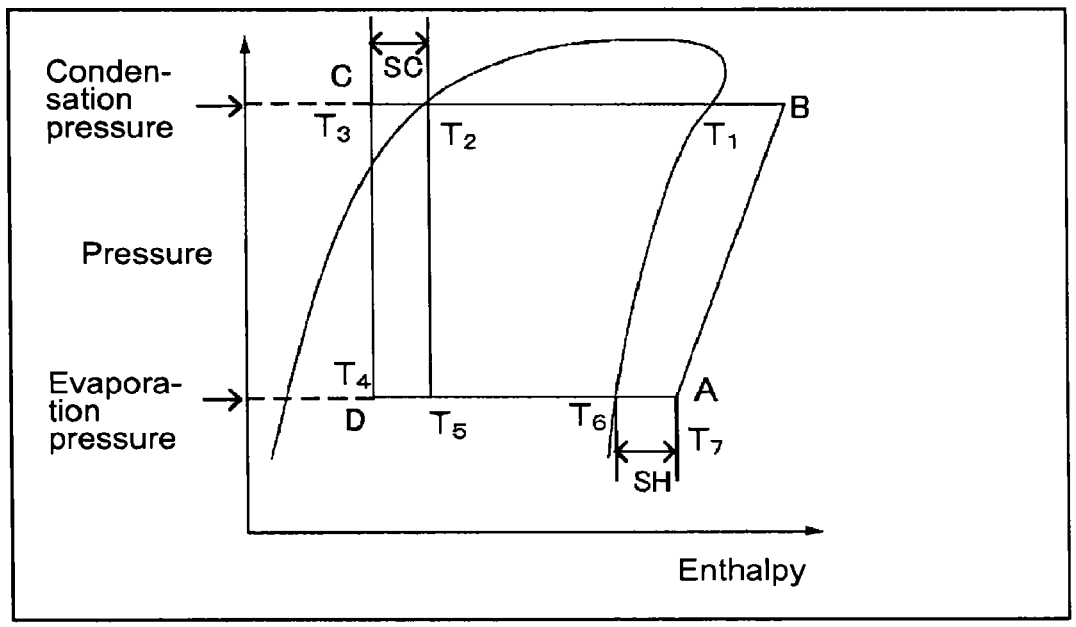
FIG. 4 is a cycle diagram illustrating the state change of a working fluid in a refrigerating cycle system in FIG. 2 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 4.

The BC process is a process wherein isobaric cooling is carried out in the condenser 12 to change the high temperature/high pressure working fluid vapor B to a low temperature/high pressure working fluid C and is represented by the BC line in FIG. 4. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, the temperature gradient of a non-azeotropic mixture fluid such as a mixture of HFO-1123 and HFO-1234yf, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 4. $T_2$–$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 4. The pressure in this process is the evaporation pressure. Of the two intersection points of the pressure enthalpy chart and the DA line, the intersection point $T_6$ on the high enthalpy side is the evaporation temperature. $T_7$–$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (1) and (2) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure):

$$Q = h_A - h_D \tag{1}$$

$$COP = Q/\text{compression work} = (h_A - h_D)/(h_B - h_A) \tag{3}$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention using the working fluid of the present invention, in a refrigerating cycle system 10 shown in FIG. 2 for example, as compared with a case where R410 (a mixture of HFC-32 and HFC-125 in a mass ratio of 1:1) which has been commonly used for an air-conditioning apparatus or the like, it is possible to achieve high levels of Q and COP, i.e. equal to or higher than those of R410A, while remarkably suppressing the global worming potential.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the lubricating oil, deterioration of materials by an acid component formed in the cycle, formation of contaminants, etc. may arise. Particularly, if the lubricating oil is a polyglycol oil or a polyol ester oil, it has extremely high moisture absorbing properties and is likely to undergo hydrolysis, and inclusion of moisture decreases properties of the lubricating oil and may be a great cause to impair the long term reliability of a compressor. Accordingly, in order to suppress hydrolysis of the lubricating oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the working fluid in a liquid state, in view of the dehydration efficiency. For example, the desiccating agent is located at the outlet of the condenser 12 or at the inlet of the evaporator 14 to be brought into contact with the working fluid.

The desiccating agent is preferably a zeolite desiccating agent in view of chemical reactivity of the desiccating agent and the working fluid, and the moisture absorption capacity of the desiccating agent.

The zeolite desiccating agent is, in a case where a lubricating oil having a large moisture absorption as compared with a conventional mineral lubricating oil is used, preferably a zeolite desiccating agent containing a compound represented by the following formula (3) as the main component in view of excellent moisture absorption capacity.

$$M_{2/n}O \cdot Al_2O_3 \cdot xSiO_2 \cdot yH_2O \tag{3}$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working fluid is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the lubricating oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the working fluid of the present invention, practically sufficient heat cycle performance can be obtained while suppressing influence over global warming.

EXAMPLES

Now, the present invention will be described in further detail with reference to Examples. However, it should be understood that the present invention is by no means restricted to specific Examples. Ex. 1 to 8 and 14 to 51 are Examples of the present invention, and Ex. 9 to 13 and 52 to 55 are Comparative Examples. Ex. 56 is an Example of R410A (a mixture of HFC-32 and HFC-125 in a mass ratio of 1:1) used for comparative evaluation in the following Examples of the present invention and Comparative Examples, and is a Reference Example.

Ex. 1 to 13

In Ex. 1 to 13, a working fluid comprising a mixture of HFO-1123 and HFO-1234yf in a proportion as identified in Table 5 was prepared, and the temperature gradient and the refrigerating cycle performance (refrigerating capacity Q and coefficient of performance COP) were measured.

[Measurement of Temperature Gradient and Refrigerating Cycle Performance]

The temperature gradient and the refrigerating cycle performance (refrigerating capacity and coefficient of performance) were measured with respect to a case where the working fluid was applied to a refrigerating cycle system 10 as shown in FIG. 2, and a heat cycle as shown in FIG. 4, that is, adiabatic compression by a compressor 11 in the AB process, isobaric cooling by a condenser 12 in the BC process, isenthalpic expansion by an expansion valve 13 in the CD process and isobaric heating by an evaporator 14 in the DA process, were carried out.

Measurement was carried out by setting the average evaporation temperature of the working fluid in the evaporator 14 to be 0° C., the average condensing temperature of the working fluid in the condenser 12 to be 40° C., the supercooling degree (SC) of the working fluid in the condenser 12 to be 5° C., and the degree of superheat (SH) of the working fluid in the evaporator 14 to be 5° C. Further, it was assumed that there was not loss in the equipment efficiency and no pressure loss in the pipelines and heat exchanger.

The refrigerating capacity and the coefficient of performance were obtained in accordance with the above formulae (1) and (2) from enthalpies h in the respective states of the working fluid, i.e. A (after evaporation, high temperature and low pressure), B (after compression, high temperature and high pressure), C (after condensation, low temperature and high pressure) and D (after expansion, low temperature and low pressure).

The thermodynamic properties required for calculation of the cycle performance were calculated based on the generalized equation of state (Soave-Redlich-Kwong equation) based on the law of corresponding state and various thermodynamic equations. If a characteristic value was not available, it was calculated employing an estimation technique based on a group contribution method.

The refrigerating capacity and the coefficient of performance were obtained as relative values based on the refrigerating capacity and the coefficient of performance of R410A measured in the same manner as above in the after-mentioned Ex. 56 respectively being 1.000. Further, GWP of the working fluid was obtained as the weighted average by the composition mass based on the GWPs of the respective compounds shown in Table 4. That is, the sum of products of mass % of the respective compounds constituting the working fluid and GWPs was divided by 100 to obtain GWP of the working fluid.

TABLE 4

| Compound | GWP |
| --- | --- |
| HFO-1123 | 0.3 |
| HFO-1234yf | 4 |
| HFC-32 | 675 |
| HFC-134a | 1,430 |

TABLE 4-continued

| Compound | GWP |
|---|---|
| HFC-125 | 3,500 |
| HFO-1234ze(E) | 6 |

The temperature gradient, the refrigerating capacity (relative to R410A) and the coefficient of performance (relative to R410A), and the results of calculation of GWP are shown in Table 5.

Figure 5:
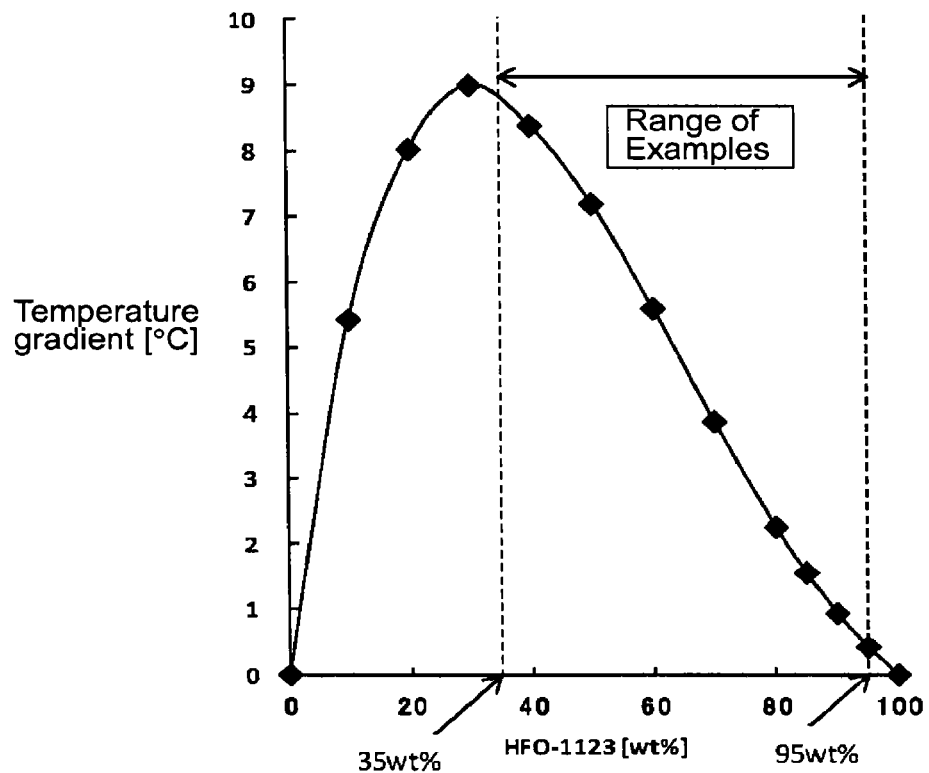
FIG. 5 is a graph showing the relation between the composition and the temperature gradient of a mixed fluid of HFO-1123 and HFO-1234yf.
Figure 6:
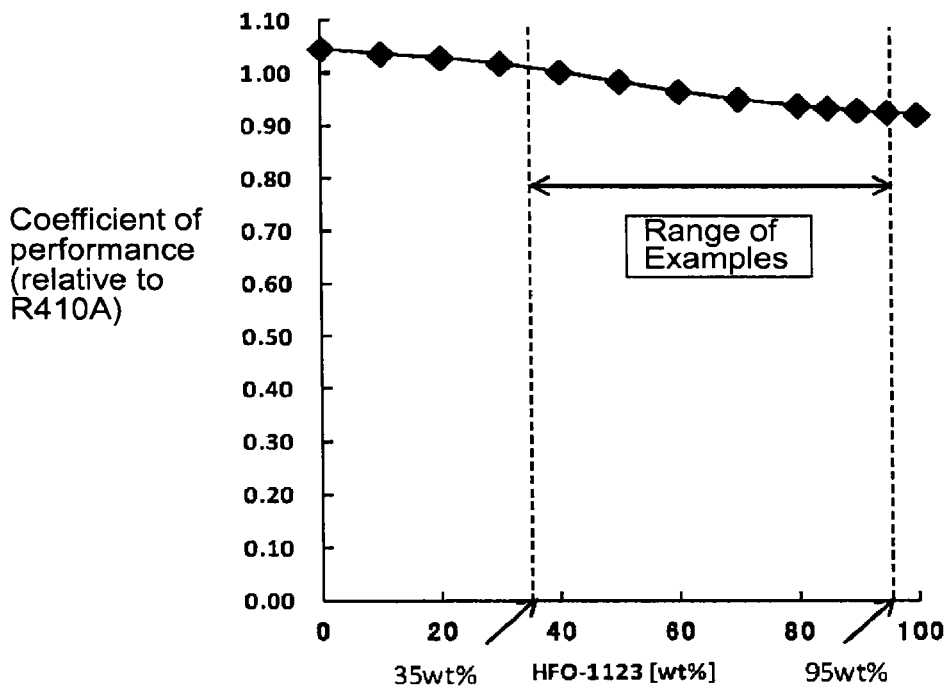
FIG. 6 is a graph showing the relation between the composition and the coefficient of performance (relative to R410A) of a mixed fluid of HFO-1123 and HFO-1234yf.
Figure 7:
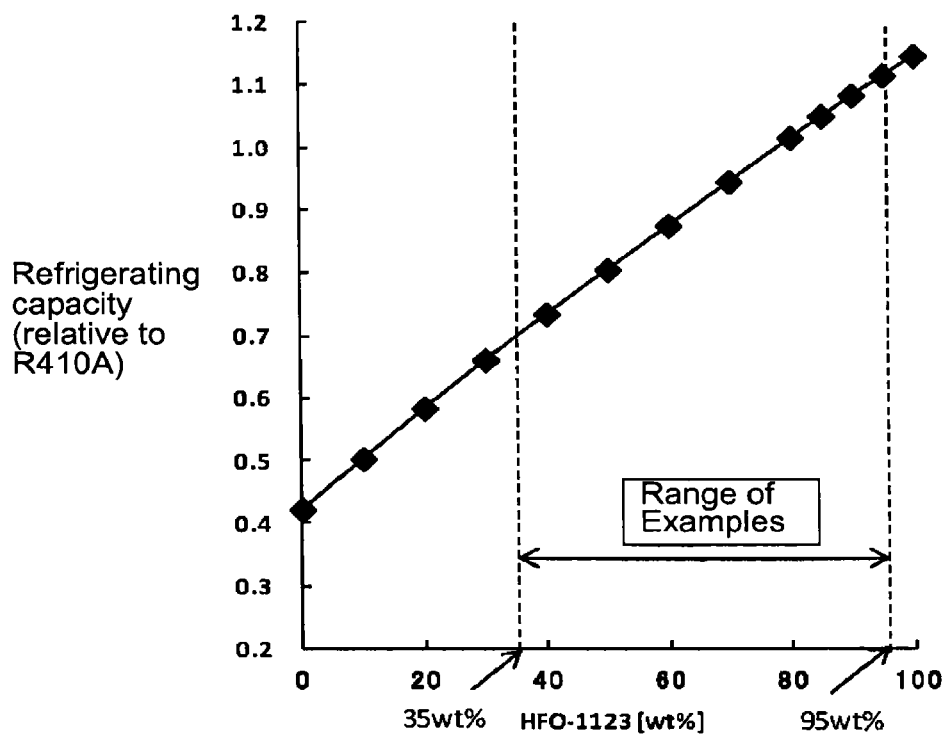
FIG. 7 is a graph showing the relation between the composition and the refrigerating capacity (relative to R410A) of a mixed fluid of HFO-1123 and HFO-1234yf.

Further, in FIGS. 5 to 7, graphs respectively illustrating the relations between the composition of the mixed fluid of HFO-1123 and HFO-1234yf, and the temperature gradient, the coefficient of performance (relative to R410A) and the refrigerating capacity (relative to R410A), are shown. "HFO-1123 [mass %]" indicated by the horizontal axis in FIGS. 5 to 7 indicates mass % of HFO-1123 based on the entire amount (100 mass %) of the working fluid.

However, for the working fluid of the present invention, HFO-1123 is intentionally combined with HFO-1234yf which is a compound having lower refrigerating capacity than HFO-1123, whereby a practically sufficient level of the refrigerating capacity was achieved in balance with the following coefficient of performance.

The coefficient of performance of HFO-1123 alone does not reach a sufficient level, however, the coefficient of performance of the working fluid of the present invention comprising a combination of HFO-1123 and HFO-1234yf within the above composition range is favorable. The coefficient of performance indicates the efficiency of the working fluid and is very important considering the efficiency of equipment, and is a value characteristic of the working fluid. Stabilization of the coefficient of performance within the above range meets the object of the present invention such that only the working fluid is replaced without changing conventional equipment.

From the viewpoint of the temperature gradient, the temperature gradient can be suppressed when the content of

TABLE 5

| | Working fluid composition | | | Relative performance (relative to R410A) | | Temperature gradient | |
|---|---|---|---|---|---|---|---|
| | HFO-1123 | | HFO-1234yf | Coefficient of | Refrigerating | | |
| | [mass %] | [mol %] | [mass %] | performance | capacity | [° C.] | GWP |
| Ex. 1 | 40 | 48 | 60 | 1.002 | 0.734 | 8.4 | 2.5 |
| Ex. 2 | 50 | 58 | 50 | 0.984 | 0.805 | 7.2 | 2.2 |
| Ex. 3 | 60 | 68 | 40 | 0.966 | 0.875 | 5.6 | 1.8 |
| Ex. 4 | 70 | 76 | 30 | 0.95 | 0.945 | 3.9 | 1.4 |
| Ex. 5 | 80 | 85 | 20 | 0.938 | 1.015 | 2.3 | 1.0 |
| Ex. 6 | 85 | 89 | 15 | 0.933 | 1.05 | 1.5 | 0.9 |
| Ex. 7 | 90 | 93 | 10 | 0.929 | 1.083 | 0.9 | 0.7 |
| Ex. 8 | 95 | 96 | 5 | 0.925 | 1.115 | 0.4 | 0.5 |
| Ex. 9 | 0 | 0 | 100 | 1.046 | 0.422 | 0.0 | 4.0 |
| Ex. 10 | 10 | 13 | 90 | 1.036 | 0.502 | 5.4 | 3.6 |
| Ex. 11 | 20 | 26 | 80 | 1.029 | 0.583 | 8.0 | 3.3 |
| Ex. 12 | 30 | 37 | 70 | 1.018 | 0.66 | 9.0 | 2.9 |
| Ex. 13 | 100 | 100 | 0 | 0.921 | 1.146 | 0.0 | 0.3 |

It is found from the results shown in Table 5 and FIGS. 5 to 7 that the working fluids in Ex. 1 to 8 having compositions within the range of the present invention have favorable coefficient of performance and refrigerating capacity relative to R410A, and have a predetermined temperature gradient or below, as compared with the working fluids in Ex. 9 to 13 having compositions out of the range of the present invention, having either of the refrigerating capacity and the coefficient of performance relative to R410A at a low level.

The refrigerating capacity of a working fluid is a factor which determines the size of apparatus itself. If HFO-1123 is combined with a compound having a lower refrigerating capacity than HFO-1123, for example, HFO-1234yf, the mixture (working fluid) comprising the combination has a lower refrigerating capacity than the working fluid consisting solely of HFO-1123. Accordingly, if such a mixture is used as an alternative to R410A, in order to make up for the low refrigerating capacity, an increase in the size of an apparatus itself and an increase in the energy used are required.

That is, to combine HFO-1123 and a compound having lower refrigerating capacity than HFO-1123 is usually considered to be quite unlikely as a means to achieve the objects of the present invention. Particularly under the present circumstances that replacement of only the working fluid is desired without replacing a conventional apparatus employing R410A, an increase in the size of the apparatus is unfavorable.

HFO-1123 is within the range of the present invention in combination of HFO-1123 and HFO-1234yf. A too high temperature gradient may restrict replacement of R410A. That is, the critical temperature range of the working fluid of the present invention is suppressed to be within the same range as that of R410A.

Accordingly, according to the working fluids in Ex. 1 to 8, practically sufficient cycle performance can be obtained while suppressing influence over global warming.

Ex. 14 to 39

In Ex. 14 to 39, working fluids comprising a mixture of HFO-1123 and HFO-1234yf, and HFC-134a, HFC-125 or HFC-32 in a proportion as identified in Table 6, 7 or 8 were prepared. In Tables 6 to 8, 1123/(1123+1234yf) [wt %] represents the proportion by mass % of HFO-1123 based on the total amount of HFO-1123 and HFO-1234yf.

Further, with respect to the obtained working fluids, the temperature gradient and the refrigerating cycle performance (refrigerating capacity Q and coefficient of performance COP) were measured by the same method as above. The refrigerating capacity and the coefficient of performance were obtained as relative values based on the refrigerating capacity and the coefficient of performance of R410A measured in the same manner as above in the after-mentioned Ex. 56 respectively being 1.000. The temperature gradient, the refrigerating capacity (relative to R410A) and the coefficient of performance (relative to R410A), and the results of calculation of GWP are shown in Tables 6 to 8.

TABLE 6

| | Working fluid composition | | | 1123/(1123 + 1234yf) | Relative performance (relative to R410A) | | Temperature gradient | GWP |
|---|---|---|---|---|---|---|---|---|
| | HFO-1123 | | HFO-1234yf | HFC-134a | | Coefficient of | Refrigerating | | |
| | [mass %] | [mol %] | [mass %] | [mass %] | [mass %] | performance | capacity | [° C.] | |
| Ex. 14 | 40 | 48 | 50 | 10 | 44.4 | 1.003 | 0.742 | 7.3 | 145.1 |
| Ex. 15 | 50 | 58 | 40 | 10 | 55.6 | 0.987 | 0.812 | 6.3 | 144.8 |
| Ex. 16 | 60 | 67 | 30 | 10 | 66.7 | 0.972 | 0.880 | 5.0 | 144.4 |
| Ex. 17 | 70 | 76 | 20 | 10 | 77.8 | 0.959 | 0.947 | 3.7 | 144.0 |
| Fx. 18 | 80 | 84 | 10 | 10 | 88.9 | 0.948 | 1.012 | 2.5 | 143.6 |

TABLE 7

| | Working fluid composition | | | 1123/(1123 + 1234yf) | Relative performance (relative to R410A) | | Temperature gradient | GWP |
|---|---|---|---|---|---|---|---|---|
| | HFO-1123 | | HFO-1234yf | HFC-125 | | Coefficient of | Refrigerating | | |
| | [mass %] | [mol %] | [mass %] | [mass %] | [mass %] | performance | capacity | [° C.] | |
| Ex. 19 | 40 | 48 | 55 | 5 | 42.1 | 0.995 | 0.751 | 7.8 | 177.3 |
| Ex. 20 | 50 | 58 | 45 | 5 | 52.6 | 0.977 | 0.823 | 6.5 | 177.0 |
| Ex. 21 | 60 | 68 | 35 | 5 | 63.2 | 0.959 | 0.893 | 4.6 | 176.6 |
| Ex. 22 | 70 | 77 | 25 | 5 | 73.7 | 0.944 | 0.964 | 3.2 | 176.2 |
| Ex. 23 | 80 | 85 | 15 | 5 | 84.2 | 0.933 | 1.034 | 1.6 | 175.8 |
| Ex. 24 | 90 | 93 | 5 | 5 | 94.7 | 0.924 | 1.101 | 0.5 | 175.5 |

TABLE 8

| | Working fluid composition | | | 1123/(1123 + 1234yf) | Relative performance (relative to R410A) | | Temperature gradient | GWP |
|---|---|---|---|---|---|---|---|---|
| | HFO-1123 | | HFO-1234yf | HFC-32 | | Coefficient of | Refrigerating | | |
| | [mass %] | [mol %] | [mass %] | [mass %] | [mass %] | performance | capacity | [° C.] | |
| Ex. 25 | 40 | 44 | 50 | 10 | 44.4 | 0.995 | 0.820 | 7.3 | 69.6 |
| Ex. 26 | 50 | 53 | 40 | 10 | 55.6 | 0.977 | 0.891 | 5.9 | 69.3 |
| Ex. 27 | 60 | 62 | 30 | 10 | 66.7 | 0.960 | 0.962 | 4.3 | 68.9 |
| Ex. 28 | 70 | 70 | 20 | 10 | 77.8 | 0.947 | 1.034 | 2.6 | 68.5 |
| Ex. 29 | 80 | 78 | 10 | 10 | 88.9 | 0.936 | 1.105 | 1.1 | 68.1 |
| Ex. 30 | 40 | 40 | 40 | 20 | 50.0 | 0.988 | 0.900 | 6.0 | 136.7 |
| Ex. 31 | 50 | 48 | 30 | 20 | 62.5 | 0.971 | 0.972 | 4.5 | 136.4 |
| Ex. 32 | 60 | 57 | 20 | 20 | 75.0 | 0.956 | 1.045 | 2.9 | 136.0 |
| Ex. 33 | 70 | 64 | 10 | 20 | 87.5 | 0.944 | 1.118 | 1.3 | 135.6 |
| Ex. 34 | 60 | 52 | 10 | 30 | 85.7 | 0.954 | 1.124 | 1.5 | 203.1 |
| Ex. 35 | 55 | 49 | 15 | 30 | 78.6 | 0.960 | 1.086 | 2.3 | 203.3 |
| Ex. 36 | 55 | 51 | 20 | 25 | 73.3 | 0.962 | 1.048 | 3.0 | 169.7 |
| Ex. 37 | 50 | 45 | 20 | 30 | 71.4 | 0.967 | 1.049 | 3.0 | 203.5 |
| Ex. 38 | 40 | 37 | 30 | 30 | 57.1 | 0.983 | 0.975 | 4.6 | 203.8 |
| Ex. 39 | 30 | 28 | 40 | 30 | 42.9 | 0.999 | 0.902 | 5.8 | 204.2 |

It is found from the results shown in Tables 6 to 8 that the working fluids in Ex. 14 to 33 having compositions within the range of the present invention have favorable coefficient of performance and refrigerating capacity relative to R410A, and a predetermined temperature gradient or below.

The working fluids in Ex. 14 to 39 contain HFC-134a, HFC-125 or HFC-32 having high GWP as compared with HFO-1123 and HFO-1234yf, however, the content is at most 30 mass % based on the entire amount of the working fluid, and GWP of each working fluid is also within a practical range.

Accordingly, according to the working fluids in Ex. 14 to 39, practically sufficient cycle performance can be obtained while suppressing influence over global warming.

Ex. 40 to 52

In Ex. 50 to 52, working fluids comprising HFO-1123, HFO-1234yf and HFO-1234ze(E) in a proportion as identified in Table 9 were prepared. Further, in Ex. 52, a working fluid consisting solely of HFO-1234ze(E) was prepared. In Table 9, 1123/(1123+1234yf) [wt %] represents the proportion by mass % of HFO-1123 based on the total amount of HFO-1123 and HFO-1234yf.

Further, with respect to the obtained working fluids, the temperature gradient and the refrigerating cycle performance (refrigerating capacity Q and coefficient of performance COP) were measured by the same method as above. The refrigerating capacity and the coefficient of performance were obtained as relative values based on the refrigerating capacity and the coefficient of performance of R410A measured in the same manner as above in the after-mentioned Ex. 56 relatively being 1.000. The temperature gradient, and the refrigerating capacity (relative to R410A) and the coefficient of performance (relative to R410A) and the results of calculation of GWP are shown in Table 9.

TABLE 9

| | Working fluid composition | | | 1123/(1123 + 1234yf) | Relative performance (relative to R410A) | | Temperature gradient | GWP |
|---|---|---|---|---|---|---|---|---|
| | HFO-1123 | | HFO-1234yf | HFO-1234ze(E) | | Co-efficient of performance | Refrigerating capacity | | |
| | [mass %] | [mol %] | [mass %] | [mass %] | [mass %] | | | [° C.] | |
| Ex. 40 | 40 | 48 | 50 | 10 | 44.4 | 1.008 | 0.724 | 8.8 | 2.7 |
| Ex. 41 | 50 | 58 | 40 | 10 | 55.6 | 0.991 | 0.793 | 7.8 | 2.4 |
| Ex. 42 | 60 | 68 | 30 | 10 | 66.7 | 0.974 | 0.861 | 6.4 | 2.0 |
| Ex. 43 | 70 | 76 | 20 | 10 | 77.8 | 0.958 | 0.928 | 4.8 | 1.6 |
| Ex. 44 | 80 | 85 | 10 | 10 | 88.9 | 0.946 | 0.995 | 3.3 | 1.2 |
| Ex. 45 | 30 | 37 | 50 | 20 | 37.5 | 1.028 | 0.641 | 9.5 | 3.3 |
| Ex. 46 | 40 | 48 | 40 | 20 | 50.0 | 1.014 | 0.712 | 9.4 | 2.9 |
| Ex. 47 | 50 | 58 | 30 | 20 | 62.5 | 0.998 | 0.780 | 8.6 | 2.6 |
| Ex. 48 | 60 | 68 | 20 | 20 | 75.0 | 0.982 | 0.845 | 7.3 | 2.2 |
| Ex. 49 | 70 | 76 | 10 | 20 | 87.5 | 0.966 | 0.909 | 6.0 | 1.8 |
| Ex. 50 | 50 | 58 | 20 | 30 | 71.4 | 1.006 | 0.764 | 9.5 | 2.8 |
| Ex. 51 | 60 | 68 | 10 | 30 | 85.7 | 0.990 | 0.827 | 8.5 | 2.4 |
| Ex. 52 | 0 | 0 | 0 | 100 | — | 1.084 | 0.336 | 0.0 | 6.0 |

It is found from the results shown in Table 9 that the working fluids in Ex. 40 to 51 having compositions within the range of the present invention have favorable coefficient of performance and refrigerating capacity relative to R410A, and have a predetermined temperature gradient or below.

The working fluids in Ex. 40 to 51 contain HFO-1234ze(E) which is very inferior in the refrigerating capacity as shown in Ex. 52 as compared with HFO-1123 and HFO-1234yf, however, its content is at most 30 mass % based on the entire amount of the working fluid, and the refrigerating cycle performance as the working fluid is within a practical range.

Accordingly, according to the working fluids in Ex. 40 to 51, a practically sufficient cycle performance can be obtained while suppressing influence over global warming.

Ex. 53 to 55

Ex. 53 to 55 are Examples of working fluids comprising a combination of HFO-1123 and HFO-1234ze(E) instead of HFO-1234yf in a proportion as identified in Table 10, and are Comparative Examples.

With respect to such working fluids, the temperature gradient and the refrigerating cycle performance (refrigerating capacity Q and coefficient of performance COP) were measured in the same method as above. The refrigerating capacity and the coefficient of performance were relative values based on the refrigerating capacity and the coefficient of performance of R410A measured in the same manner as above in the after-mentioned Ex. 54 respectively being 1.000. The temperature gradient, the refrigerating capacity (relative to R410A) and the coefficient of performance (relative to R410A) and the results of calculation of GWP are shown in Table 10.

TABLE 10

| | Working fluid composition | | | Relative performance (relative to R410A) | | Temperature gradient | GWP |
|---|---|---|---|---|---|---|---|
| | HFO-1123 | | HFO-1234ze(E) | Coefficient of performance | Refrigerating capacity | | |
| | [mass %] | [mol %] | [mass %] | | | [° C.] | |
| Ex. 53 | 40 | 48 | 60 | 1.046 | 0.655 | 13 | 3.7 |
| Ex. 54 | 50 | 58 | 50 | 1.025 | 0.732 | 11.8 | 3.2 |
| Ex. 55 | 60 | 68 | 40 | 1.000 | 0.808 | 9.8 | 2.6 |

As shown in Table 10, the working fluids in Ex. 53 to 55 containing HFO-1123 and HFO-1234ze(E) have a great temperature gradient, and although influence over global warming can be suppressed, a practically sufficient cycle performance can hardly be obtained.

Ex. 56

In Ex. 56, with respect to R410A (a mixture of HFC-32 and HFC-125 in a mass ratio of 1:1) to be relative comparison with the above Ex. 1 to 55, the temperature gradient and the refrigerating cycle performance (refrigerating capacity Q and coefficient of performance COP) were measured in the same manner as the above. The refrigerating capacity and the coefficient of performance are 1.000 as shown in Table 11. The temperature gradient and the result of calculation of GWP are shown in Table 11.

TABLE 11

| | Working fluid composition [mass %] | | Relative performance (relative to R410A) | | Temperature gradient [° C.] | GWP |
|---|---|---|---|---|---|---|
| | HFC-125 | HFC-32 | Coefficient of performance | Refrigerating capacity | | |
| Ex. 56 (R410A) | 50 | 50 | 1.000 | 1.000 | 0.2 | 2,087.5 |

Since R410A is a conventional working fluid, the cycle performance is based on this working fluid in Examples, and when the cycle performance of a working fluid reaches the same level, the working fluid is evaluated to have practically sufficient cycle performance. R410A consists solely of HFC, and has high GWP.

It is found from the above results that in Ex. 1 to 8 and 14 to 51 which are Examples of the present invention, GWP is low, and based on R410A, the cycle performance is at a practically sufficient level. Further, the working fluids in Ex. 1 to 3, 14 to 16, 19 to 21, 25 to 28 and 30 to 39 are working fluids having a HFO-1123 content of at most 70 mol % and having no self-decomposition property, and are working fluids with good workability which require no time and effort for securing the safety.

[Estimation of Critical Temperature]

With respect to HFO-1123, HFO-1234yf and a mixed fluid of them having a composition as identified in Table 12, the critical temperature was estimated by visually observing the position of extinction of the gas-liquid interface and coloring by critical opalescence. The results are shown in Table 12 and FIG. 8. "HFO-1123 [wt %]" indicated by the horizontal axis in FIG. 8 indicates mass % of HFO-1123 based on the entire amount (100 mass %) of the mixed fluid.

TABLE 12

| Composition of mixed fluid [mass %] | | |
|---|---|---|
| HFO-1123 | HFO-1234yf | Critical temperature [° C.] |
| 0 | 100 | 94.7 |
| 50 | 50 | 76.9 |
| 70 | 30 | 69.9 |
| 100 | 0 | 59.2 |

Figure 8:
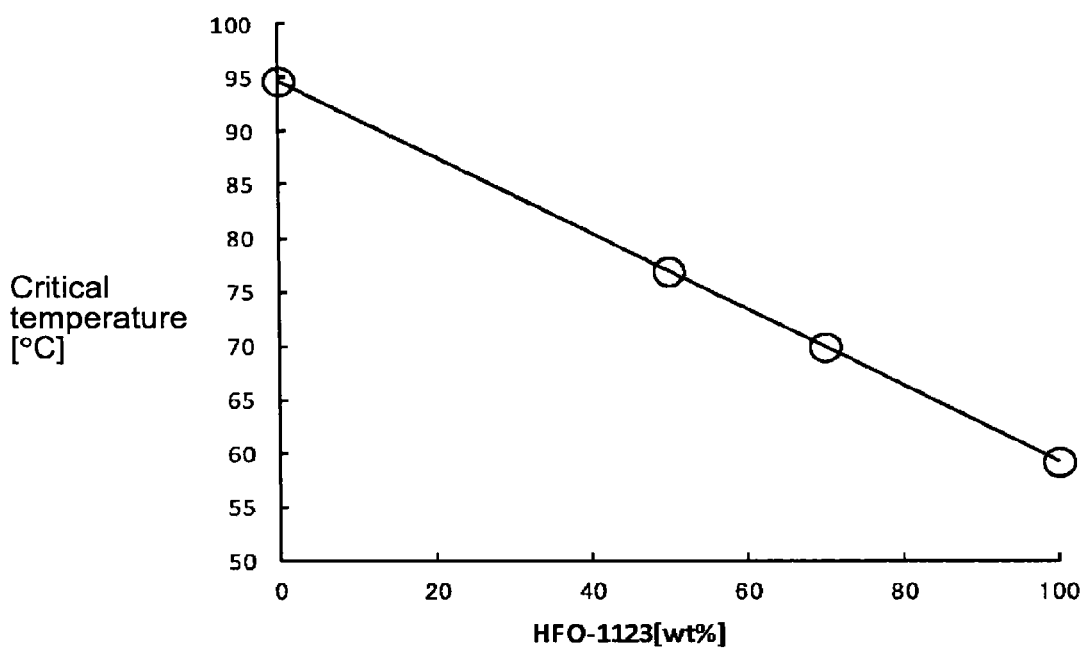
FIG. 8 is a graph showing the relation between the composition and the critical temperature of a mixed fluid of HFO-1123 and HFO-1234yf.

As shown in FIG. 8, the critical temperature increases by combination of HFO-1123 and HFO-1234yf as compared with HFO-1123 alone. That is, the mixed fluid of HFO-1123 and HFO-1234yf may have a higher critical temperature as compared with a critical temperature of HFO-1123 alone of 59.2° C. It is found from FIG. 8 that when the proportion of HFO-1234yf is at least 5 mass % based on the total amount of HFO-1234yf and HFO-1123, a sufficient critical temperature as an alternative to R410A is obtained. Accordingly, by combination of HFO-1123 and HFO-1234yf, a working fluid which is widely applicable as an alternative to R410A can be provided.

HFO-1234yf has a lower refrigerating capacity than HFO-1123. However, the present inventor has found that by the mixture ratio within the above range, a decrease in the capacity by mixing of HFO-1234yf can be made up for by a conventional technique, and accomplished the present invention. The present invention is useful under the present circumstances such that only replacement of the R410A working fluid is desired without replacement of equipment as described above.

INDUSTRIAL APPLICABILITY

The working fluid of the present invention is useful as a refrigerant for a refrigerator (such as a built-in showcase, a separate showcase, an industrial fridge freezer, a vending machine or an ice making machine), a refrigerant for an air-conditioning apparatus (such as a room air-conditioner, a store package air-conditioner, a building package air-conditioner, a plant package air-conditioner, a gas engine heat pump, a train air-conditioning system or an automobile air-conditioning system), a working fluid for power generation system (such as exhaust heat recovery power generation), a working fluid for a heat transport apparatus (such as a heat pipe) or a secondary cooling fluid.

REFERENCE SYMBOLS

10: refrigerating cycle system, 11: compressor, 12: condenser, 13: expansion valve, 14: evaporator, 15, 16: pump.

What is claimed is:

1. A working fluid, comprising:
   40-60 mass % HFO-1123 based on a total mass of working fluid;
   10-60 mass % HFO-1234ze(E) based on the total mass of the working fluid; and
   0-50 mass % HFO-1234yf based on the total mass of the working fluid.

2. A composition for a heat cycle system, comprising:
   the working fluid of claim 1; and
   a lubricating oil.

3. The composition for a heat cycle system of claim 2, further comprising a stabilizer.

4. An air conditioning apparatus, comprising the working fluid of claim 1 as a refrigerant.

5. An automobile, comprising an air conditioning apparatus having the working fluid of claim 1 contained therein as a refrigerant.

6. The working fluid of claim 1, comprising:
   40-50 mass % HFO-1123 based on a total mass of working fluid; and
   50-60 mass % HFO-1234ze(E) based on a total mass of the working fluid.

7. A composition for a heat cycle system, comprising:
   the working fluid of claim 6; and
   a lubricating oil.

8. The composition for a heat cycle system of claim 7, further comprising a stabilizer.

9. An air conditioning apparatus, comprising the working fluid of claim 6 as a refrigerant.

10. An automobile, comprising an air conditioning apparatus having the working fluid of claim 6 contained therein as a refrigerant.

11. The working fluid of claim 1, consisting of HFO-1123 and HFO-1234ze(E).

12. A composition for a heat cycle system, comprising:
    the working fluid of claim 11; and
    a lubricating oil.

13. The composition for a heat cycle system of claim 12, further comprising a stabilizer.

14. An air conditioning apparatus, comprising the working fluid of claim 11 as a refrigerant.

15. An automobile, comprising an air conditioning apparatus having the working fluid of claim 11 contained therein as a refrigerant.

16. The working fluid of claim 1, comprising 10-50 mass % HFO-1234yf based on the total mass of the working fluid.

17. The working fluid of claim 1, wherein the working fluid has a global warming potential (GWP) of less than 6.

* * * * *